(12) United States Patent
Redkar et al.

(10) Patent No.: US 7,511,134 B1
(45) Date of Patent: Mar. 31, 2009

(54) METHOD FOR PREPARING N-ACETYLGLUCOSAMINE

(75) Inventors: Sham N. Redkar, Bound Brook, NJ (US); Vilas M. Chopdekar, Edison, NJ (US)

(73) Assignee: JFC Technologies, Bound Brook, NJ (US)

( * ) Notice: Subject to any disclaimer, the term of this patent is extended or adjusted under 35 U.S.C. 154(b) by 636 days.

(21) Appl. No.: 11/223,677

(22) Filed: Sep. 9, 2005

Related U.S. Application Data

(60) Provisional application No. 60/611,709, filed on Sep. 22, 2004.

(51) Int. Cl.
*C07H 5/04* (2006.01)
*C07H 5/06* (2006.01)
(52) U.S. Cl. .................................. 536/55.2; 536/55.3
(58) Field of Classification Search ............... 536/55.2, 536/55.3
See application file for complete search history.

(56) References Cited

U.S. PATENT DOCUMENTS

| | | | |
|---|---|---|---|
| 2,792,388 A * | 5/1957 | Ruelins | 536/53 |
| 5,902,801 A * | 5/1999 | Schleck et al. | 514/62 |
| 5,998,173 A | 12/1999 | Haynes et al. | 435/84 |
| 6,486,307 B1 | 11/2002 | Gandhi et al. | 536/20 |
| 6,693,188 B2 | 2/2004 | Bohlmann et al. | 536/55.2 |
| 2004/0091976 A1 | 5/2004 | Deng et al. | 435/84 |
| 2005/0148545 A1 * | 7/2005 | Fosdick et al. | 514/62 |

OTHER PUBLICATIONS

N-AcetylGlucosamine Glyconutrient Information, Sep. 13, 2008, 3 pages.
Safety (MSDS) data for diethylamine, Sep. 2, 2008, 5 pages.
Safety (MSDS) data for triethylamine, Sep. 2, 2008, 6 pages.

\* cited by examiner

*Primary Examiner*—Shaojia Anna Jiang
*Assistant Examiner*—Everett White
(74) *Attorney, Agent, or Firm*—Jack Matalon

(57) ABSTRACT

A method for preparing n-acetylglucosamine starting from glucosamine base having a purity level of at least about 99 wt. % and a maximum halide content of about 0.01 wt %. The glucosamine base is slurried in a diluent comprising a $C_1$-$C_4$ straight or branched-chain alcohol, e.g., isopropyl alcohol, sec. butyl alcohol, tert. butyl alcohol, etc. Thereafter, an acylating agent, e.g., acetic anhydride, present in at least a stoichiometric amount, is slowly added to the slurry while maintaining the reaction mixture at a temperature below about 20° C. The n-acetylglucosamine prepared by the process of the invention will be quite pure, e.g., it will have a purity of at least 98%, as measured by HPLC, a melting point in the range of 196-205° C. and a specific rotation, measured at room temperature after standing in water for several hours, of $[\alpha]_D = 39\text{-}43°$.

16 Claims, No Drawings

METHOD FOR PREPARING N-ACETYLGLUCOSAMINE

CROSS-REFERENCE TO RELATED PATENT APPLICATION

This Application claims the benefit of Provisional Application Ser. No. 60/611,709 filed Sep. 22, 2004.

FIELD OF THE INVENTION

The invention relates to a method for preparing halide-free N-acetylglucosamine using halide-free glucosamine base as the starting material.

BACKGROUND OF THE INVENTION

Glucosamine is a well-known amino monosaccharide found in chitin, glyco-proteins and glycosaminoglycans. Glucosamine is widely used for the treatment of rheumatic fever, arthritic and arthosic complaints, in the acute as well as chronic forms, as well as in the treatment of pathological conditions originating from metabolic disorders of the osteo-articular tissue. Although products in the marketplace are labeled as, or referred to as, "glucosamine", they are misnomers since such products consist of glucosamine hydrochloride or as unreacted mixtures of glucosamine hydrochloride and a salt such as potassium or sodium sulfate.

Free glucosamine base may be prepared by the method recited in *Chem. Ber.*, volume 75, page 1274. Such method involves the treatment of glucosamine hydrochloride with an ethanolic solution of a tertiary base such as triethylamine. Triethylamine hydrochloride is filtered off and the free glucosamine is then recovered from the reaction mixture. However, triethylamine is a toxic material even in small quantities and the yield of the free glucosamine base is quite low. Moreover, the free glucosamine base still contains residual chloride. Glucosamine hydrochloride may also be prepared by the method disclosed in U.S. Patent; the process involves the grinding of chitin to a very fine size, followed by digestion with concentrated hydrochloric acid. The crude glucosamine hydrochloride is then decolorized with activated charcoal and assayed by pH titration with a base.

N-acetylglucosamine may also be prepared by microbial fermentation. For example, see U.S. Pat. Nos. 5,998,173 and 6,693,188 as well as U.S. Published Patent Application Publication Nos. 2004/0091976 A1, 2004/0077055 A1 and 2003/0148998 A1. However, the microbial fermentation methods disclosed in the foregoing patents and published patent applications are complex, time-consuming and expensive to conduct. Furthermore, the microbial fermentation methods result in the production of various types of complex mixtures, requiring separation of the n-acetylglucosamine from the mixtures and purification of the separated n-acetylglucosamine.

OBJECT OF THE INVENTION

It would be most desirable if a relatively simple, synthetic process could be developed for preparing n-acetylglucosamine by acetylation of glucosamine. However, glucosamine is quite unstable at ambient temperature and is hygroscopic. Therefore, regardless of the source of the glucosamine, it is commercially available only in the form of a halide salt, usually the hydrochloride, since the glucosamine free base can only be isolated from aqueous reaction mixtures in the form of its salt.

The problem then becomes as to a process for converting glucosamine hydrochloride into pure, halide-free glucosamine base that can then be used as the starting material for the acetylation reaction to produce pure n-acetylglucosamine. Provisional application Ser. No. 60/611,709 filed Sep. 22, 2004 solves this problem and it is incorporated herein by reference in its entirety.

DETAILS OF THE INVENTION

The starting material employed in the method of this invention is a halide-free glucosamine base that is prepared from glucosamine hydrochloride in accordance with the process disclosed in provisional application Ser. No. 60/611,709 filed Sep. 22, 2004 is repeated hereinbelow:

The method for converting a glucosamine halide into a halide-free glucosamine base involves the following steps:

(a) a glucosamine halide salt (e.g., glucosamine hydrochloride, glucosamine hydroiodide, etc.) is reacted with a lithium base in the presence of a $C_1$-$C_4$ alcohol to thereby generate a $C_1$-$C_4$ alcohol solution of a lithium halide and an insoluble halide-free glucosamine base; and (b) the insoluble halide-free glucosamine base is separated from the $C_1$-$C_4$ alcohol solution of the lithium halide salt.

For maximum yields, the reaction should be carried out at a temperature of about 15 to about 35° C.; conveniently, the reaction may be carried out at ambient temperatures.

The $C_1$-$C_4$ alcohol may be, e.g., methanol, ethanol (preferably anhydrous) isopropanol, etc.; the preferred alcohol comprises methanol. The lithium base may be anhydrous lithium hydroxide, lithium hydroxide monohydrate, lithium methoxide, lithium ethoxide or lithium isopropoxide. The preferred lithium base comprises anhydrous lithium hydroxide. It has been found that the presence of water in the reaction mixture reduces the yield of the halide-free glucosamine base. Accordingly, it is preferred that the reaction be carried out under anhydrous conditions. In general, the lithium base is employed in an amount of about 1.0 to about 1.2 moles per mole of halide present in the glucosamine halide salt. Excess lithium base is unnecessarily wasteful and will reduce the yield of the halide-free glucosamine base. Typically, the alcohol is employed in an amount of about 1 to about 10 parts, preferably 3 to 6 parts, per part of lithium base.

After allowing the reaction between the glucosamine halide salt and the lithium base to proceed (preferably with stirring) for about 5 minutes to about 2 hours, the solid halide-free glucosamine base is filtered off from the resultant alcohol solution of the lithium halide and washed with additional alcohol. The halide-free glucosamine base may then be dried under vacuum at a temperature of about 15 to about 30° C. The yield typically ranges from about 85 to about 90° C.

The halide-free glucosamine base is very pure. It will have a purity level of at least about 99.0 wt %. For the purposes of this invention, the term "halide-free" means that the halide content will be a maximum of about 0.01 wt. %, e.g., 100 ppm or less and very often, the halide content will be less than 50 ppm and as low as 25 ppm. Based upon the residual halide content of the halide-free glucosamine base, the lithium residue in the glucosamine base will generally be a maximum of about 20 ppm and very often, the lithium residue content will be less than 10 ppm.

The prior art teaches that sodium methoxide or sodium hydroxide may be used to remove chloride from glucosamine hydrochloride. However, the by-product sodium chloride is insoluble in a lower alcohol such as methanol and the glucosamine base is also insoluble in methanol. Therefore, the glucosamine hydroxide is used as the base, the product sodium chloride. However, when lithium hydroxide is used as the base, the glucosamine base product is insoluble in methanol whereas the by-product lithium chloride is very soluble in methanol, thus facilitating the separation of the glucosamine base product from the lithium chloride by-product.

The method for preparing n-acetylglucosamine by acylating the halide-free glucosamine base obtained by the method described above is quite straight-forward. And involves the following steps:

(a) The halide-free glucosamine base is slurried in a diluent comprising a $C_1$-$C_4$ alcohol. Preferably, the alcohol is a branched-chain alcohol such as isopropanol, sec.-butyl alcohol or tert.-butyl alcohol. Typically, the diluent will be employed in an amount of about 1 to about 10 parts by weight, preferably 2-5 parts by weight, per part of the halide-free glucosamine base. Since the halide-free glucosamine base is hygroscopic and unstable at ambient temperature, it should be preferably used promptly after it has been converted from the glucosamine hydrochloride into the halide-free glucosamine base. If that is not feasible, the halide-free glucosamine base may be stored in a sealed container at a reduced temperature, e.g., in a refrigerator at about 0 to about 10° C.

(b) The slurry from step (a) is chilled to, and maintained at, a temperature below 20° C., preferably below 15° C., e.g., 0 to 10° C. To the slurry, while stirring, is slowly added an acylating agent such as acetic anhydride. The acylating agent should be utilized in at least a stoichiometric amount, preferably about 1.1 to about 1.2 moles, per mole of the halide-free glucosamine base present in the slurry. The acylation reaction is quite exothermic and therefore, the acylating agent is slowly added, e.g. over a period of about 30 minutes to 10 hours, while maintaining the temperature of the reaction mixture in the range indicated above (an ice-water bath is usually sufficient for maintaining the reaction mixture at the desired temperature). When about 50% of the requisite amount of the acylating agent has been added to the reaction mixture, the reaction mixture will become homogenous in nature. If desired, the reaction mixture may be decolorized at this point by stirring in activated charcoal and filtering the decolorized reaction mixture, which maintaining the temperature in the range indicated above.

(c) After all of the acylating agent has been added to the reaction mixture, the reaction mixture is allowed to come to room temperature. If desired, the reaction mixture may be heated to a temperature of about 40-45° C., then cooled to room temperature. The crystalline n-acetylglucosamine is then filtered from the reaction mixture, washed with a $C_1$-$C_4$ alcohol and then dried by conventional means, e.g., nitrogen stream, vacuum oven, heat lamp, etc.

The n-acetylglucosamine prepared by the process of the invention will be quite pure, e.g., it will have a purity of at least 98%, as measured by HPLC, a melting point in the range of 196-205° C. and a specific rotation, measured at room temperature after standing in water for several hours, of $[\alpha]_D$=39-43°.

The following nonlimiting examples shall serve to illustrate the embodiments of this invention. Unless otherwise indicated, all parts and percentages are on a weight basis.

EXAMPLE 1

In a reaction vessel were charged 215.6 g (1 m) of glucosamine hydrochloride and 700 ml of methanol. The reaction mixture was stirred for 15 minutes (the glucosamine hydrochloride was insoluble in the methanol) and thereafter, 44.1 g (1.05 ml) of lithium hydroxide monohydrate were added, with stirring, over a period of 10 minutes at 25° C. The temperature rose to 31° C. and, after 20 minutes of stirring, a clear solution resulted at 29° C. Stirring was continued at 28-30° C. for a period of two hours and the product slowly precipitated out of the reaction mixture. The reaction mixture was chilled to 15-16° C., and the product was filtered off and washed with 200 ml of methanol. The product was sucked dry and was thereafter vacuum dried at 30° C. for 4 hours. The yield of the glucosamine base was 151 g (84.3%) and its melting point was 109-110° C. One gram of the product was dissolved in 20 ml of purified water to which 5 ml of 0.1N silver nitrate were added. No precipitate resulted, indicating that the glucosamine base product was chloride-free.

EXAMPLE 2

In a reaction vessel were charged 160 g of the halide-free glucosamine base obtained in Example together with 500 ml of methanol. The reaction mixture was cooled, with stirring, to 5° C., thereafter, 10 g of acetic acid were added dropwise to the reaction mixture, while maintaining the reaction mixture at a temperature of 5° C. Then 115 g of acetic anhydride were added dropwise to the reaction mixture, while maintaining the reaction mixture at a temperature of 5° C. It was noted that when about 50% of the acetic anhydride had been added to the reaction mixture, the reaction mixture became homogenous and solid material started separating out. The reaction mixture was then stirred overnight at ambient temperature and then warmed to 40-45° C. and stirred for 1 hour at such temperature. The reaction mixture was then allowed to cool to 30° C. and was filtered. The resultant solid n-acetylglucosamine was sucked dry and washed with several 50 ml portions of methanol and thereafter dried in a vacuum oven at 60-70° C. The yield of the white solid was 158 g and it had a melting point of 201-202° C. The specific rotation measured at room temperature on a 0.5 g sample in 50 ml of water allowed to stand for 5 hours was $[\alpha]_D$=40.28°. An HPLC assay of the n-acetylglucosamine indicated that the purity level was 99%.

What is claimed is:

1. A method for preparing n-acetylglucosamine which comprises the steps of:
   (a) slurry glucosamine base in a diluent comprising a $C_1$-$C_4$ alcohol, said glucosamine base having a purity level of at least 99 wt. % and a maximum halide content of about 0.01 wt. %;
   (b) adding an acylating agent in at least a stoichiometric amount to the slurry from step (a), while maintaining the reaction mixture at a temperature below about 20° C.; and
   (c) recovering n-acetylglucosamine from the reaction mixture resulting from step (b).

2. The method of claim 1 wherein the acylating agent comprises acetic anhydride.

3. The method of claim 2 wherein the acylating agent is employed in an amount of about 1.1 to about 1.2 moles per mole of glucosamine base present in the slurry.

4. The method of claim 1 wherein the diluent comprises a branched-chain alcohol.

5. The method of claim 4 wherein the alcohol is selected from the group consisting of isopropyl alcohol, sec. butyl alcohol and tert. butyl alcohol.

6. The method of claim 1 wherein the reaction mixture in step (b) is maintained at a temperature of about 0 to 15° C.

7. The method of claim 1 wherein the diluent is employed in an amount of about 1 to about 10 parts, by weight, per part of glucosamine base.

8. The method of claim 7 wherein the diluent is employed in an amount of 2 to 5 parts, by weight, per part of glucosamine base.

9. A method for preparing n-acetylglucosamine which comprises the steps of:
   (1) reacting a glucosamine halide with a lithium base in the presence of a $C_1$-$C_4$ alcohol to thereby generate a $C_1$-$C_4$ alcohol solution of a lithium halide and an insoluble halide-free glucosamine base; and
   (2) separating the insoluble halide-free glucosamine base from $C_1$-$C_4$ alcohol solution of the lithium halide salt;
   (3) slurrying the insoluble halide-free glucosamine base in a diluent comprising the same or different $C_1$-$C_4$ alcohol;
   (4) adding an acylating agent in at least a stoichiometric amount to the slurry from step (3), while maintaining the reaction mixture at a temperature below about 20° C.; and
   (5) recovering n-acetylglucosamine from the reaction mixture resulting from step (4).

10. The method of claim 9 wherein the acylating agent comprises acetic anhydride.

11. The method of claim 10 wherein the acylating agent is employed in an amount of about 1.1 to about 1.2 moles per mole of glucosamine base present in the slurry.

12. The method of claim 9 wherein the diluent employed in step (3) comprises a branched-chain alcohol.

13. The method of claim 12 wherein the alcohol is selected from the group consisting of isopropyl alcohol, sec. butyl alcohol and tert. butyl alcohol.

14. The method of claim 9 wherein the reaction mixture in step (b) is maintained at a temperature of about 0 to 15° C.

15. The method of claim 9 wherein the diluent is employed in an amount of about 1 to about 10 parts by weight, per part of glucosamine base.

16. The method of claim 15 wherein the diluent is employed in an amount of 2 to 5 parts by weight, per part of glucosamine base.

* * * * *